H. HESS.
GAGE.
APPLICATION FILED OCT. 18, 1910.
1,163,921.
Patented Dec. 14, 1915.
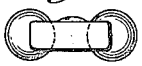
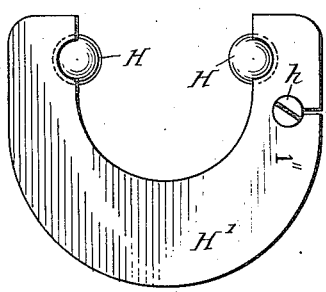
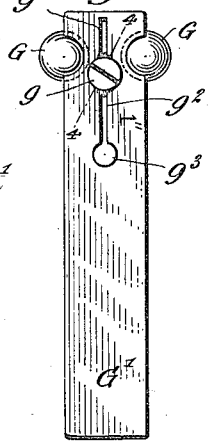
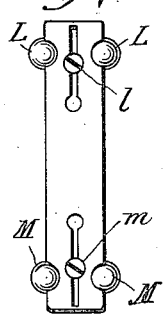
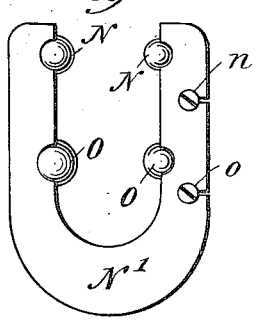
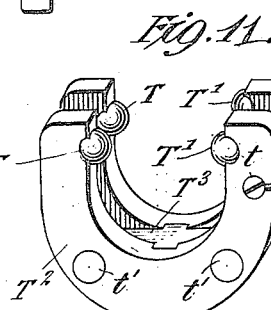
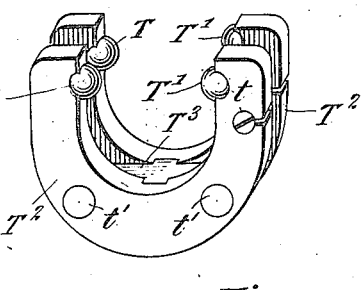
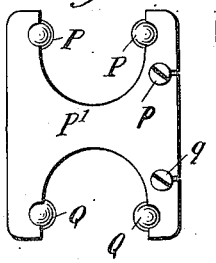
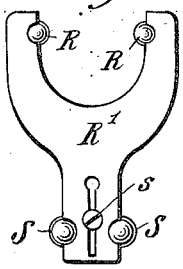
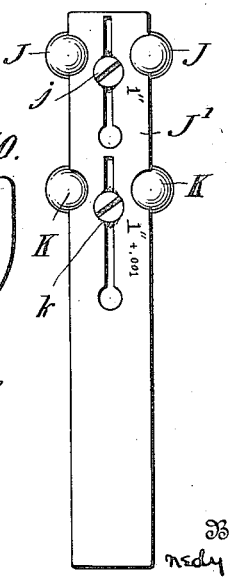
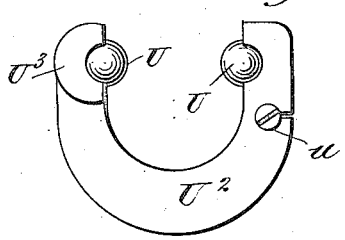
Witnesses:
Inventor
Henry Hess
By his Attorneys, Rogers, Kennedy & Campbell, by Donald Campbell.

UNITED STATES PATENT OFFICE.

HENRY HESS, OF PHILADELPHIA, PENNSYLVANIA.

GAGE.

1,163,921.          Specification of Letters Patent.      Patented Dec. 14, 1915.

Application filed October 18, 1910. Serial No. 587,703.

*To all whom it may concern:*

Be it known that I, HENRY HESS, a citizen of the United States, residing at Philadelphia, in the county of Philadelphia and State of Pennsylvania, have invented certain new and useful Improvements in Gages, of which the following is a specification, reference being had therein to the accompanying drawing.

My invention relates to gages, and by this term I do not refer broadly to all instruments for determining the trueness of mechanical objects, but only to those instruments for determining or measuring the size or dimension of objects. Gages with this understanding of the term, are of a great many types and for a great many uses, but for the purpose of the present application they may be considered as divided into two general classes, namely "fixed-dimension gages" and "changeable-dimension gages." The latter class is that in which the gaging surfaces are relatively movable over a considerable latitude so that the gage can be set to the dimension of the object, the size of which is thereupon indicated upon a scale usually a part of the gage. The present invention relates more particularly to, and has its greatest field of usefulness in the other class, namely, that of fixed-dimension gages wherein in the practical use of the gage there is no adjustment of the gaging surfaces, the same being permanently set for a fixed size or dimension to which the object being gaged must accord in the use of the instrument.

Gages of the present invention are to have provided as an integral part of them preformed hardened steel balls, the gaging contacts consisting solely in portions of such balls; and such gages being preferably made or provided in complete sets of sizes, for example one gage for each difference of a sixteenth of an inch within a given range.

This application is subsidiary to my main application now pending, said co-pending application covering the broad idea of a gage or gaging system for dimensions or sizes in which the gages consist of a handle or support in combination with either a single preformed hardened steel ball or a plurality thereof constituting all of the gaging portions of the gage, and the said support and ball or balls connected together by immovable connections.

The present subsidiary application is directed to that specific embodiment of the broad invention which contemplates a gage consisting of a handle or support in immovable connection with a plurality of preformed hardened steel balls, the said balls being scientifically attached at exact known distances from each other; or a gaging system comprising a graduated set of such gages graded to afford an increasing series of known sizes.

As instances of the present invention the drawings hereof show the so-called caliper gages both internal or external, end gages and mixed gages, for example partly internal and partly external, and each requiring a plurality of the hardened spheres. And for each such gage the present invention may be applied with variations, such as, for example, the variation from a single to a double gage or measure with a scientifically determined difference between the two so as to constitute of the instrument a so-called tolerance gage, with respect to which the object being measured must exceed the smaller measure and be under the larger measure to comply with the gage. In using the present invention I contemplate not only the employment of such variations as that just referred to, but also the addition of miscellaneous supplementary details, such for example as devices for originally standardizing or correcting the gages, for taking them apart, etc.

A gage or system of gages constructed in accordance with the above statement of the present invention affords a great many advantages with respect to both manufacture thereof and the use or practice thereof. For example, it will be appreciated that the employment of a spherical shape for all of gaging parts gives the very greatest accuracy of contact in measuring an object as to its internal or external diameter or otherwise. The actual part of the instrument which is in contact with the object is never a plane or an area, but points of contact, and theoretically these would be mathematical points. In no gage embodying my invention is it required to set or adjust a flat or plane area with respect to the object to be measured, and all the errors of such are thereby obviated.

With respect to the employment of preformed spherical hardened steel balls there is a great deal to say. Thus a ball possesses the advantage of maintaining its correctness of shape in a higher degree than other shapes. This is because all articles made of hardened steel are subject to change due to a change in the conditions of internal stress. A hardened steel object is internally strained in all directions due to violent stresses produced in quenching the steel from a high temperature. In time these stresses relieve themselves with the result that the article somewhat changes its shape. The change will be the greater if the differences be greater in the internal strains in different sections of the object. Therefore the less uniform in shape an object is, the greater will be the change in shape due to the gradual release of these internal strains. Further the greater the departure of an object from uniformity of section, the greater will be the strains originally set up in quenching the high temperature. The sphere is the one shape which is uniform in every direction, and in which therefore the least internal strains will be set up by quenching, and in which further there will be the least change in shape by the gradual release of the internal strains. The hardness of these steel spheres is known to be superlative and the sphere may be made very much harder than any other shapes such as cylinders, rings, bars, etc. The sphere is also subject to very much less damage by direct nicking or indenting of its surface and by change of shape due to violent or improper treatment, as for example when the gage is carelessly allowed to fall upon a hard object. Besides these advantages the hardened steel spheres afford cheapness in the construction of the gage, which is a very considerable factor. The cheapness and accuracy of hardened steel spheres permit under my invention an entire system of gages to be constructed, the same of less cost to the user than that of a single gage of the heretofore well known adjustable type, such for example as the micrometer gage, which is in reality a machine, and one of great accuracy of workmanship, it being designed with moving parts enabling it to be set to correspond with the size of an object, whereupon such size is indicated upon the scale which also constitutes a part of the micrometer gage. With my invention employing the hardened steel balls, the latter are merely made by well known scientific methods in proper sizes. and an appropriate series of them selected to be made up into systems of gages; and by the word "system" I intend not only the graded set of balls and the means that supports them, but also the means for distinguishing them one from the other, such for example as the directions or indicating marks, which would preferably be figures showing the actual sizes, the same etched or otherwise applied upon the balls or their supports.

A system of gages made according to my invention is adapted not merely to be used as a standard of reference for other gages, but owing to the qualities hereinbefore and hereinafter referred to, the same are adapted to direct use by a workman in a shop.

I have already referred to that class of gages which may be termed "fixed-dimension gages" and have stated that the present invention has particular reference thereto. Indeed it is one of the great advantages of the present invention, as the same has been previously set forth, that it enables each gage to be a fixed-dimension gage, not only by the immovable connections of the spheres to their supports, but by the fixed, exact and unchangeable relation between the measuring points, parts or contacts of a given gage. Resulting from this in turn are many advantages of real practical value. Thus all mechanism is dispensed with and the instrument is purely and simply a gage and has none of the complications of a machine, to which objection the micrometer gage is open; there are no screws to be operated, and there is no adjustment or movement of parts in the employment of the gage. Indeed this will be seen to greatly enhance the convenience of the article, as the workman or his superior has merely to make a selection of the proper gage, and then he has in hand a solid thing of predetermined characteristics and with no possibility of error either in the adjustment thereof to the object to be measured or in the reading of the scale which pertains to it. Greater durability results not only because the wear involved is distributed over a great many individual gages, but also because of the entire absence of any wear due to movement or adjustment of screws or other parts. The simplicity of the immovable attachment of the steel spheres to their supports promotes the cheapness and therefore the availability of the invention, this being due to the absence of expensive working parts, the only problem and expense being incurred in fixing the steel spheres, when a plurality are employed, at the required distance from each other, for accomplishing which I have devised expedients. It will be understood that by immovability I mean lack of operation or adjustment when in practical use, and I do not mean that the spheres are to be undetachable; in some cases I would prefer to have them detachable. A further advantage involved when all the gaging parts or spheres have immovable relation to each other, is the ease of standardization of the gage. In an ordinary caliper gage it is quite difficult to produce an absolute parallelism between the jaw surfaces, and the slightest strain put upon any of the parts will throw these surfaces out of parallelism and at once destroy the accuracy of the gage, to restore which is a very delicate piece of work, usually quite beyond the capacity of the ordinary mechanic and those not in command of special facilities. With, however, the preformed steel spheres for gaging parts the contrary is true, and when for any reason whatsoever the size has been lost it may be restored by a simple bending of the support until the balls will again properly accord with a test or master gage; there is no question of restoring parallelism, as it is entirely unimportant how the supporting parts themselves may twist or wind, and the ball having only a single point of contact all of the difficulties due to width and length of surface contact are done away with.

This statement while not wholly true with certain of the less important variations illustrated herein is partly with respect to them, and so far as said statement fails to be wholly true the correcting expedient is provided and shown in the drawings.

The caliper gage of the present invention besides the many important advantages and functions above stated, possesses in addition the superlative advantage with respect to gaging interior and exterior dimensions, that the steel balls will find inaccuracies in the surfaces to be explored which the ordinary flat faced caliper gage is unable to detect. This is because the balls can follow the changes in the shape of the surfaces since they measure successive dimensions, whereas an ordinary caliper gage owing to its substantial length of contact is able only to measure minimum or maximum dimensions. It is understood that a caliper gage is supposed to be of the same dimension as that of the object it is to measure, and with this in mind it is quite conceivable that a flat faced exterior caliper gage which is, for example, .001 inch larger than the thickness of the material could not be passed over the latter if it were at all irregular. My novel gage on the contrary, however, would pass over the material even though the gage were only .0001 larger than the dimension of the material.

I will now describe several instances of the kind of gage herein referred to embodying the characteristics of the present invention, and will then point out the novel features in the claims.

In the drawings accompanying this specification and forming a part of the same, Figure 1 is a side view of an interior caliper gage embodying my invention and comprising a supporting handle in immovable connection with two preformed hardened steel balls, said balls being scientifically attached at exact known distances from each other. Fig. 2 is an edge view of the gage shown in Fig. 1, and Fig. 3 is an end view thereof, while Fig. 4 is a partial cross-section on the plane 4—4 of Fig. 1 showing a detail. Fig. 5 shows the invention applied to an exterior caliper gage, the same indicated in side view. Each of the above figures refers to a gage consisting only of two of the hardened spheres applied to a supporting handle Fig. 6 shows a variation of the gage of Figs. 1 to 4 in which the first pair of gaging spheres is duplicated, making four of them, and attached to the supporting handle at slightly different distances enabling the gage to be used as a tolerance gage for interiors. Fig. 7 shows a tolerance gage similar to Fig. 6 but of another form. Fig. 8 shows an exterior caliper gage in which the pair of spheres is duplicated to constitute a tolerance gage, and Fig. 9 shows another form thereof. Fig. 10 shows a mixed caliper gage partly exterior and partly interior. In all of the above described figures, the gages when in action present only one sphere opposed to one other sphere. Fig. 11 indicates an exterior caliper gage in which two separated spheres are opposed to two other separated spheres. Fig. 12 indicates a form in which two of the spheres are opposed to a single sphere, the same being shown in side view, and Fig. 13 is a top view thereof.

In my aforesaid co-pending application, the drawings indicate in one figure thereof a complete series or set of gages graded in their sizes and contained in an inclosure, which latter as well as the gages has the proper fractions or numbers designating their respective sizes, and it will be understood that the same idea is to be employed with the present invention when considered as a system.

G, G, Figs. 1, 2 and 3, represent a plurality or set of preformed spherical hardened steel balls, the same being opposed to each other so as to afford proper contacts for gaging, in this instance, gaging interiors, constituting of the article an interior caliper gage. There are two of the balls G, and these are immovably connected to a common support or supporting handle G'. The immovable connection between the balls and the support will preferably be by means of a low fusing solder, a soft cement or the like. It is understood that the construction of the parts and their attachment is to be scientifically accomplished so that the outer surfaces or contact points of the balls will be at exact known distances apart. When secured together G, G and G' form a complete and permanent gage which may be one of a graduated system as already indicated, and each gage may have a numerical indication or marking of the size of the gage or the function it is to perform.

The exact shape or contour or construction of the support G' is not of importance and may be indefinitely varied, and the same may be said with reference to the portion of the support to which the balls are to be attached. The balls are shown as attached near one end of the support, which latter has been machined to receive them, and Figs. 2 and 3 show the support to be a comparatively thin bar of metal of convenient size for handling.

Since sometimes it may be important to have a means not for adjustment but for standardizing the gage initially or perhaps correcting it in the case of wear, I have provided a standardizing means which may be said to comprise a tapered screw or plug or its equivalent engaging in a threaded recess properly situated in the gage so as to take advantage of the elasticity of the metal which should be able to yield slightly under influence of the tapered screw. $g$, Figs. 1, 3 and 4, indicates such a tapered screw or plug and it is shown engaged in a threaded recess in the body of the gage located more or less intermediate of the position of the two balls G, G. In order to allow for an effect when the screw is manipulated, the gage must be specially constructed, for example, by means of an opening formed in the body of the gage contiguous to the threaded recess, this opening permitting a yielding through the metal's elasticity. In Fig. 1 it is seen that there are two opposed openings, namely $g'$ and $g^2$, one on each side of the screw or plug and threaded recess; and these openings may take the form as shown of a single slot intersecting the threaded recess, said slot to be formed, for example, by boring a hole $g^3$ and then sawing the slot therefrom so as to intersect the threaded recess.

If the gage as at first assembled, does not exactly meet the required dimension, it will be seen that by turning the screw plug more or less the metal will yield through its elasticity so as to afford a microscopic adjustment of the balls G, G toward or from each other. In order to secure the same when standardized and for in effect solidifying the screw plug with the gage body, I apply a medium such as soft solder which is melted and flowed into immediate contact so as to harden in contact with both the metal of the gage and the screw plug.

Another embodiment of my present invention is seen in Fig. 5 in the form of a caliper gage which is not an interior gage but is an exterior caliper gage, it having the hardened spheres H, H opposed to each other but with open space between them instead of the metal of the support being between them as in the case of Fig. 1. The support H' in this instance may be of a horseshoe form or its equivalent, the spheres to be immovably attached to it as already described. The standardization means in this case may consist of a tapered screw $h$ as before with an opening contiguous thereto consisting of a single slot $h'$.

Fig. 6 shows a variation of the gage of Fig. 1 in which the latter is supplemented by duplicating the first set of opposed spheres so as to provide two distinct sets both attached to the same support, but the latter set affixed at a slightly different distance apart, whereby the gage may serve as a tolerance gage. Thus spheres J, J are attached to a handle J' at a given exact distance apart, and the spheres K, K at a slightly greater distance apart, thus enabling interiors to be gaged to a degree of accuracy equal to the difference between the two dimensions, that is the dimension established by the spheres J, J and that established by the spheres K, K. Incidentally the gage of Fig. 6 is shown with standardizing screws $j$ and $k$ as before.

Fig. 7 shows a variation over the gage shown in Fig. 6 by reason of the spheres L, L being set near one end of the support while the spheres M, M are set at the other end, whereas in Fig. 6 one end of the support constitutes a handle, both sets of spheres being located in the same direction from the point of handling the gage.

In Fig. 8 is combined the idea of an exterior caliper gage embodying my invention as in Fig. 5, and the idea of a tolerance gage embodying my invention as in Fig. 6. N, N Fig. 8, represents the first set of opposed spheres, and O, O represents the second set, the first set being slightly farther apart than the second set so that a plate of material being gaged may be brought to an exact thickness with a degree of accuracy depending upon the difference in dimensions determined by the spheres N, N on the one hand, or the spheres O, O on the other hand. N' is the supporting handle in the gage of Fig. 8, and $o$ is the standardizing screw for the spheres O, O, while $n$ is the standardizing screw for the spheres N, N.

Fig. 9 illustrates a further variation in which a set of spheres P, P is a given distance apart and at the other end of the gage the spheres Q, Q are a slightly different distance apart, the standardizing screws $p$ and $q$ being shown as usual.

In Fig. 10 a mixed gage is illustrated consisting of an exterior caliper with spheres R, R at one end of the support R' and an interior caliper formed by spheres S, S at the other end with a standardizing screw $s$ for the latter.

In some instances it is desirable to employ more than two spheres for each gaging operation, and this is carried out in accordance with my invention by the arrangement seen in Fig. 11 which is an exterior caliper gage having at one side a pair of spheres T, T which are opposed to a similar pair T', T' at the other side. This gage may be constructed for example in the following manner. It may be built up of two single caliper gages each identical with that seen in Fig. 5 in which T², T², Fig. 11, represent the supports, and $t$ the standardizing screw; the said two single gages to be permanently connected together with an intermediate plate T³ between them so as to hold the spheres T, T on the one hand and T', T' on the other hand properly spaced apart, the permanent connection being made, for example, by means of rivets $t'$.

Another form of this invention is one wherein two spheres U, U at one side are opposed to a single sphere U' at the other side as in Figs. 12 and 13, U² representing the support which is expanded into the broad yoke at U³ at one side so as to allow the spheres U, U to be secured thereto at a suitable distance apart. $u$ represents a standardizing screw as before.

With respect to this and with respect generally to the broad invention hereof, the following points are made as to the difference between my invention and gages that precede it in the art; the advantages to be now referred to not having been previously herein recited. The employment of separate preformed hardened steel spheres permits all the remainder of each gage to be made of soft metal, which therefore further reduces first cost as compared with other gages. Most kinds of gages are exceedingly difficult and costly pieces of work to produce. Moreover owing to such use of soft metal there will be a total absence of various stresses that are set up when the entire instrument has to be hardened, or when its ends only have to be hardened. Where the entire gage is hardened the changes in length due to the gradual relief of internal strain are very pronounced, since not only do these strains produce a direct change in size or length, but also a more or less pronounced change in shape, such as to distort the gage and thereby further cause length or size changes. All of which is overcome by my taking appropriate preformed prehardened steel spheres and immovably attaching them to soft metal supports.

In using the terms "ball" and "sphere" I do not exclude a preformed ball or sphere that has had its surface or body partly removed by being machined or otherwise, so long as sufficient of the sphere remains intact to perform the gaging functions that my invention contemplates.

In the claims the term "gaging contacts" or like term will be used to denote the contact point or points or lines at which the gage contacts the object being gaged; in my gages there is no contact at surfaces, but substantially only at points and lines. And the spheres will be referred to as affording all these gaging contacts, as distinguished from having some of the contacts consist of a part other than the spheres, which would be excluded from my invention.

What I claim as new and desire to secure by Letters Patent is:

1. In a fixed-dimension caliper gage the combination of a rigid support for a plurality of preformed spheres, and in immovable connection with said support a plurality of preformed spheres spaced apart from each other by said support at exact known distance whereby to coöperate in calipering to determine the correspondence of object and gage; said support being slitted to permit minute distortion of the instrument for standardizing the initial spacing of said contact spheres; and a device adapted to effect the spreading or closing of the material about said slit for effecting such distortion and sphere spacing.

2. In a fixed-dimension caliper gage the combination of a rigid support for a plurality of preformed spheres, and in immovable connection with said support a plurality of preformed spheres spaced apart from each other by said support at exact known distance whereby to coöperate in calipering to determine the correspondence of object and gage; said support being slitted to permit minute distortion of the instrument for standardizing the initial spacing of said contact spheres; and a device adapted to effect the spreading or closing of the material about said slit for effecting such distortion and sphere spacing, and soft solder applied for locking the support and spreading device from displacement after standardization.

3. In a fixed-dimension caliper gage the combination of a rigid support for a plurality of preformed spheres, and in immovable connection with said support a plurality of preformed spheres spaced apart from each other by said support at exact known distance whereby to coöperate in calipering to determine the correspondence of object and gage; said support being slitted to permit minute distortion of the instrument for standardizing the initial spacing of said contact spheres; and a device adapted to spread or close the material about said slit for effecting such distortion and sphere spacing, said device consisting of a wedge-screw whose axis stands at right angles to the general plane of said support.

4. In a fixed-dimension caliper gage the combination of a rigid support for a plurality of preformed spheres, and in immovable connection with said support a plurality of non-contacting preformed spheres spaced apart from each other by said support at exact known distance whereby to coöperate in calipering to determine the correspondence of object and gage, and another set of such spheres spaced apart by said support at a slightly different distance whereby the gage serves as a tolerance gage.

5. In a fixed-dimension caliper gage the combination of a rigid support for a plurality of preformed spheres, and in immovable connection with said support a plurality of non-contacting preformed spheres spaced apart from each other by said support at exact known distance whereby to coöperate in calipering to determine the correspondence of object and gage, and another set of such spheres spaced apart by said support at a slightly different distance whereby the gage serves as a tolerance gage; said support being adapted to be distorted at one point to minutely alter the distance between the first set of spheres, and at another point to minutely alter the distance between the second set of spheres, for the purpose of initial standardization of the instrument.

6. In a fixed-dimension caliper gage the combination of a rigid support for a plurality of preformed spheres, and in immovable connection with said support a plurality of non-contacting preformed spheres spaced apart form each other by said support at exact known distance whereby to coöperate in calipering to determine the correspondence of object and gage, and another set of such spheres spaced apart by said support at a slightly different distance whereby the gage serves as a tolerance gage; said support being slitted at one point to permit minute distortion for initially spacing the first set of spheres and at another point to permit minute distortion for initially spacing the second set of spheres; and a plurality of devices adapted to spread or close the material about said slit for effecting such distortions, sphere-spacings, and standardization.

In testimony whereof I have affixed my signature in presence of two witnesses.

HENRY HESS.

Witnesses:
 GEORGE M. HENRIE,
 MARY M'CALLA.